United States Patent
Dimou et al.

(10) Patent No.: US 12,432,713 B2
(45) Date of Patent: Sep. 30, 2025

(54) SEMI-PERSISTENT SCHEDULING PHYSICAL UPLINK CONTROL CHANNEL (PUCCH) HYBRID AUTOMATIC REPEAT REQUEST DEFERRAL FOR PUCCH GROUPS

(71) Applicant: QUALCOMM Incorporated, San Diego, CA (US)

(72) Inventors: Konstantinos Dimou, New York City, NY (US); Yan Zhou, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 17/817,250

(22) Filed: Aug. 3, 2022

(65) Prior Publication Data
US 2023/0045191 A1    Feb. 9, 2023

Related U.S. Application Data

(60) Provisional application No. 63/260,061, filed on Aug. 6, 2021.

(51) Int. Cl.
*H04W 72/12* (2023.01)
*H04L 1/18* (2023.01)
(Continued)

(52) U.S. Cl.
CPC ....... *H04W 72/1263* (2013.01); *H04L 1/1812* (2013.01); *H04W 72/20* (2023.01)

(58) Field of Classification Search
CPC ... H04W 28/04; H04W 72/04; H04W 72/042; H04W 88/08; H04W 72/1263; H04W 72/20; H04W 72/1278
(Continued)

(56) References Cited

U.S. PATENT DOCUMENTS 11,637,658 B2 * 4/2023 Babaei ............... H04W 72/23 370/329
11,671,205 B2 * 6/2023 Babaei ............... H04L 1/1812 370/329
(Continued)

OTHER PUBLICATIONS

3GPP TSG RAN WG1 #104b-e, e-Meeting, Apr. 12-20, 2021, R1-2103574, Source: NTT Docomo, Inc., Title: Discussion on HARQ-ACK feedback enhancements for Rel. 17 URLLC, Agenda Item: 8.3.1.1. (Year: 2021).*
(Continued)

*Primary Examiner* — Peter G Solinsky
*Assistant Examiner* — Sanjay K Dewan
(74) *Attorney, Agent, or Firm* — ArentFox Schiff LLP

(57) ABSTRACT

Apparatus, methods, and computer-readable media for semi-persistent scheduling (SPS) physical uplink control channel (PUCCH) hybrid automatic repeat request (HARQ) deferral for PUCCH groups are disclosed herein. A user equipment (UE) may receive, from a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral. The UE also may delay transmission of at least the first HARQ feedback payload based on different configurations for HARQ feedback deferral between the first SPS downlink packet and the second SPS downlink packet.

30 Claims, 11 Drawing Sheets

(51) Int. Cl.
*H04L 1/1812* (2023.01)
*H04W 72/1263* (2023.01)
*H04W 72/20* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 11,778,608 | B2* | 10/2023 | Shin | H04W 76/27 370/329 |
| 2011/0134774 | A1* | 6/2011 | Pelletier | H04W 76/15 370/242 |
| 2011/0223924 | A1* | 9/2011 | Lohr | H04W 72/23 370/252 |
| 2012/0113944 | A1* | 5/2012 | Yang | H04L 5/0094 370/329 |
| 2013/0039307 | A1* | 2/2013 | Han | H04L 1/1861 370/329 |
| 2013/0195066 | A1* | 8/2013 | Lee | H04W 72/0446 370/329 |
| 2013/0201841 | A1* | 8/2013 | Zhang | H04W 72/04 370/252 |
| 2020/0213981 | A1* | 7/2020 | Park | H04W 72/23 |
| 2022/0140950 | A1* | 5/2022 | Babaei | H04L 1/1851 370/329 |
| 2022/0140954 | A1* | 5/2022 | Kim | H04L 1/1861 370/329 |
| 2023/0095899 | A1* | 3/2023 | Yang | H04L 1/0026 370/329 |
| 2023/0096989 | A1* | 3/2023 | Lee | H04L 5/0055 370/329 |
| 2023/0098805 | A1* | 3/2023 | Wang | H04W 72/20 370/329 |
| 2023/0224100 | A1* | 7/2023 | Bae | H04L 1/1854 370/329 |

OTHER PUBLICATIONS

3GPP TSG RAN WG1 #104b-e, e-Meeting, Apr. 12-20, 2021, R1-2102392, Source: OPPO, Title: HARQ-ACK enhancements for Rel-17 URLLC/IIoT, Agenda Item: 8.3.1. (Year: 2021).*
International Search Report and Written Opinion dated Apr. 11, 2023 from corresponding PCT Application No. PCT/US2022/074528.
OPPO: "HARQ-ACK enhancements for Re1-17 1-30 URLLC/IIoT", 3GPP Draft; R1-2102392, 3rd Generation Partnership Project (3GPP), Mobile Competence Centre ; 650, Route Des Lucioles ; F-06921 Sophia-Antipolis Cedex ; FRANCE, vol. RAN WGI1 No. e-Meeting; Apr. 12, 2021-Apr. 20, 2021, 7 Apr. 7, 2021 (Apr. 7, 2021), XP052177109, Retrieved from the Internet: URL:https://ftp.3gpp.org/tsg_ran/WG1_RL1/TSGR1_104b-e/Docs/R1-2102392.zip R1-12102392 HARQ-ACK enhancements for Re1-17URLLCIIoT.docx [retrieved on Apr. 7, 2021].
NTT Docomo et al: "Discussion on HARQ-ACK feedback enhancements for Re1.17 URLLC", 3GPP Draft; R1-2103574, 3rd Generation Partnership Project (3GPP), Mobile Competence Centre; 650, Route Des Lucioles; F-06921 Sophia-Antipolis Cedex ; France, vol. RAN WG1, No. e-Meeting; Apr. 12, 2021-Apr. 20, 2021, Apr. 7, 2021 (Apr. 7, 2021), XP052178276, Retrieved from the Internet: URL:https://ftp.3gpp.org/tsg_ran/WG1_RL1/TSGR1_104b-e/Docs/RI-2103574.zip R1-2103574_UE feedback enhancements for HARQ-ACK_fina1.docx [retrieved on Apr. 7, 2021].

* cited by examiner

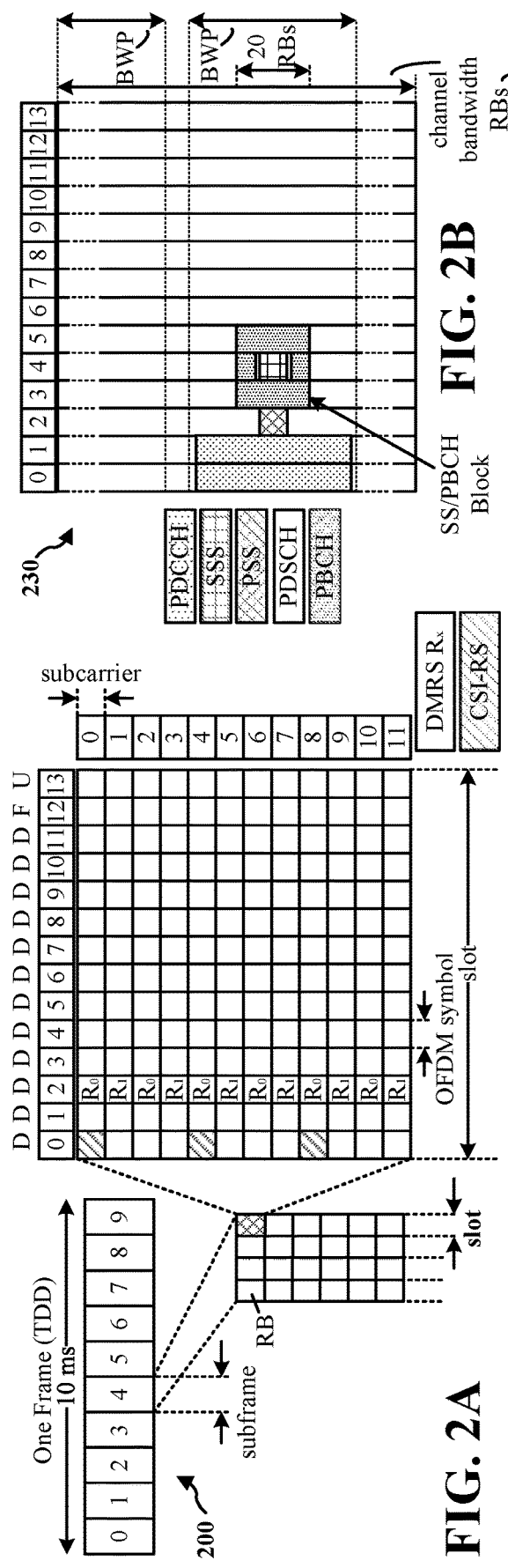
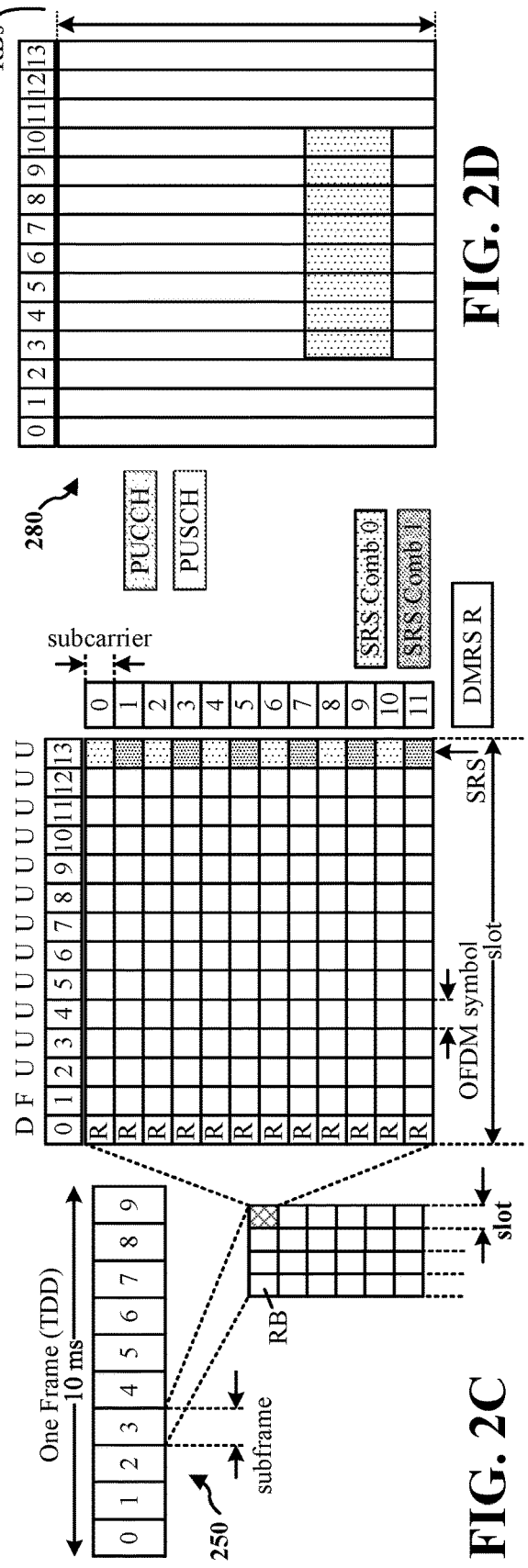
FIG. 2A, FIG. 2B, FIG. 2C, FIG. 2D

SEMI-PERSISTENT SCHEDULING PHYSICAL UPLINK CONTROL CHANNEL (PUCCH) HYBRID AUTOMATIC REPEAT REQUEST DEFERRAL FOR PUCCH GROUPS

CROSS REFERENCE TO RELATED APPLICATION

This application claims the benefit of U.S. Provisional Application Ser. No. 63/260,061, entitled "SEMI-PERSISTENT SCHEDULING PHYSICAL UPLINK CONTROL CHANNEL (PUCCH) HYBRID AUTOMATIC REPEAT REQUEST DEFERRAL FOR PUCCH GROUPS" and filed on Aug. 6, 2021, of which is expressly incorporated by reference herein in its entirety.

BACKGROUND

Technical Field

The present disclosure relates generally to wireless communication, and more particularly, to techniques for semi-persistent scheduling (SPS) physical uplink control channel (PUCCH) hybrid automatic repeat request (HARQ) deferral for PUCCH groups.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the feature "SPS PUCCH HARQ Deferral to a first available PUCCH" may be configured per SPS configuration. The reason is that typically different SPS configurations carry different types of traffic with different characteristics (e.g. periodicity, data rate, packet expiration time, among others). In some aspects, the SPS PUCCH HARQ deferral to the first available PUCCH implies that the physical resource identifier (PRI) scheduled for the SPS PUCCH has to be reserved up to a maximum deferral time. Logically, in most aspects, the maximum deferral time may be associated with a downlink (DL) packet expiration. In some aspects, the maximum deferral time may be linked with the SPS periodicity. In other aspects, reserving an unused uplink resource for a relatively short period of time (e.g., when the maximum deferral time is about 1 ms) is desirable. However, in some use cases (e.g., when the packet expiration, or the SPS period is equal to 4 ms), reserving an unused resource for up to 4 msec may not be desirable. In other aspects, retransmitting a relatively short DL packet is not as adversely impactful compared to retransmitting a relatively large packet in the use case of SPS PUCCH HARQ collisions with DL symbols.

In some aspects, a given PUCCH group may consist of two types of SPS HARQ bits (e.g., (1) SPS HARQ-ACK bits configured to be deferred upon collision, and (2) SPS HARQ-ACK bits not configured to be deferred upon collision). In this regard, upon collision between the PUCCH group with DL symbols, all bits of a whole HARQ codebook in the PUCCH group can be deferred. The advantage of this implementation is that it does not change the HARQ codebook and both the network (e.g., gNB) and UE are aware of the already used HARQ codebook. The network may attempt to avoid grouping SPS PUCCH HARQ bits configured for deferral with other HARQ bits not configured for deferral.

Another aspect includes configuration of SPS PUCCH HARQ deferrals per PUCCH group. This may not be as advantageous as the aforementioned techniques since a PUCCH group can be formed on the basis of criteria related to uplink traffic and UE PUCCH transmission capabilities. The SPS HARQ deferral can be linked to the type of traffic carried in the SPS configuration. For example, a given PUCCH group may carry traffic from two different SPS configurations (e.g., (1) SPS configuration 1 with period equal to 1 ms, carrying periodic traffic expiring after 1 ms, and (2) SPS configuration 2 with period equal to 6 ms, carrying periodic traffic expiring after 6 ms).

In many aspects, SPS HARQ-ACK deferral is advantageous for SPS configuration 1, and the SPS HARQ-ACK deferral may be reconfigurable by SPS re-configuration via Radio Resource Control (RRC) signaling, or in other aspects, there may be sufficient time for the network to schedule a request for 1-shot transmission of cancelled HARQ signaling. In some aspects, the feature of SPS HARQ-ACK deferral, may involve the scheduler to reserve the PUCCH resources of the PUCCH group until the whole HARQ codebook is transmitted. In one aspect, a scheduling strategy may include refraining from combining HARQ codebooks from two different SPS configurations with differences in the support of the "SPS HARQ-ACK deferral" feature into a same PUCCH group.

In this regard, the subject technology provides for the SPS HARQ-ACK deferral to the first available PUCCH being configured per SPS configuration. If a PUCCH transmission consists of HARQ-ACK for at least one SPS configuration with deferral, the PUCCH transmission is to be deferred to the first available PUCCH. The subject technology provides for delaying transmission of uplink control channel signaling by configuration of a given PUCCH group consisting of HARQ information corresponding to different SPS-based HARQ deferral configurations. In this regard, the subject technology increases the efficiency and reliability of uplink control channel transmissions by facilitating the delay of uplink control channel signaling carrying SPS HARQ information upon potential collisions.

In an aspect of the disclosure, a method, a computer-readable medium, and an apparatus are provided. The apparatus may be a UE. The apparatus is configured to receive, from a base station, a plurality of semi-persistent scheduling (SPS) configurations, wherein each of the plurality of SPS configurations is associated with a received SPS downlink packet. The apparatus is also configured to determine whether at least one SPS configuration of the plurality of SPS configurations indicates that a hybrid repeat request (HARQ) feedback associated with the received SPS downlink packet is configured for deferral. The apparatus is also configured to delay transmission of each HARQ feedback associated with different SPS downlink packets based on the at least one SPS configuration indicating that the HARQ feedback associated with the received SPS downlink packet is configured for deferral.

In an aspect of the disclosure, a method, a computer-readable medium, and an apparatus are provided. The apparatus may be a UE. The apparatus is configured to receive, from a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral. The apparatus is also configured to delay transmission of at least the first HARQ feedback payload based on different configurations for HARQ feedback deferral between the first SPS downlink packet and the second SPS downlink packet.

In an aspect of the disclosure, a method, a computer-readable medium, and an apparatus are provided. The apparatus may be a base station. The apparatus is configured to transmit, to a user equipment (UE), a plurality of semi-persistent scheduling (SPS) configurations, wherein each of the plurality of SPS configurations is associated with an SPS downlink packet, wherein at least one SPS configuration of the plurality of SPS configurations indicates whether a hybrid repeat request (HARQ) feedback associated with the SPS downlink packet is configured for deferral. The apparatus is also configured to receive, from the UE, a delayed transmission of each HARQ feedback associated with different SPS downlink packets when the at least one SPS configuration indicates that the HARQ feedback associated with the SPS downlink packet is configured for deferral.

In an aspect of the disclosure, a method, a computer-readable medium, and an apparatus are provided. The apparatus may be a base station. The apparatus is configured to transmit, to a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral. The apparatus is also configured to receive, from the UE, a delayed transmission of at least the first HARQ feedback payload based on different configurations for HARQ feedback deferral between the first SPS downlink packet and the second SPS downlink packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
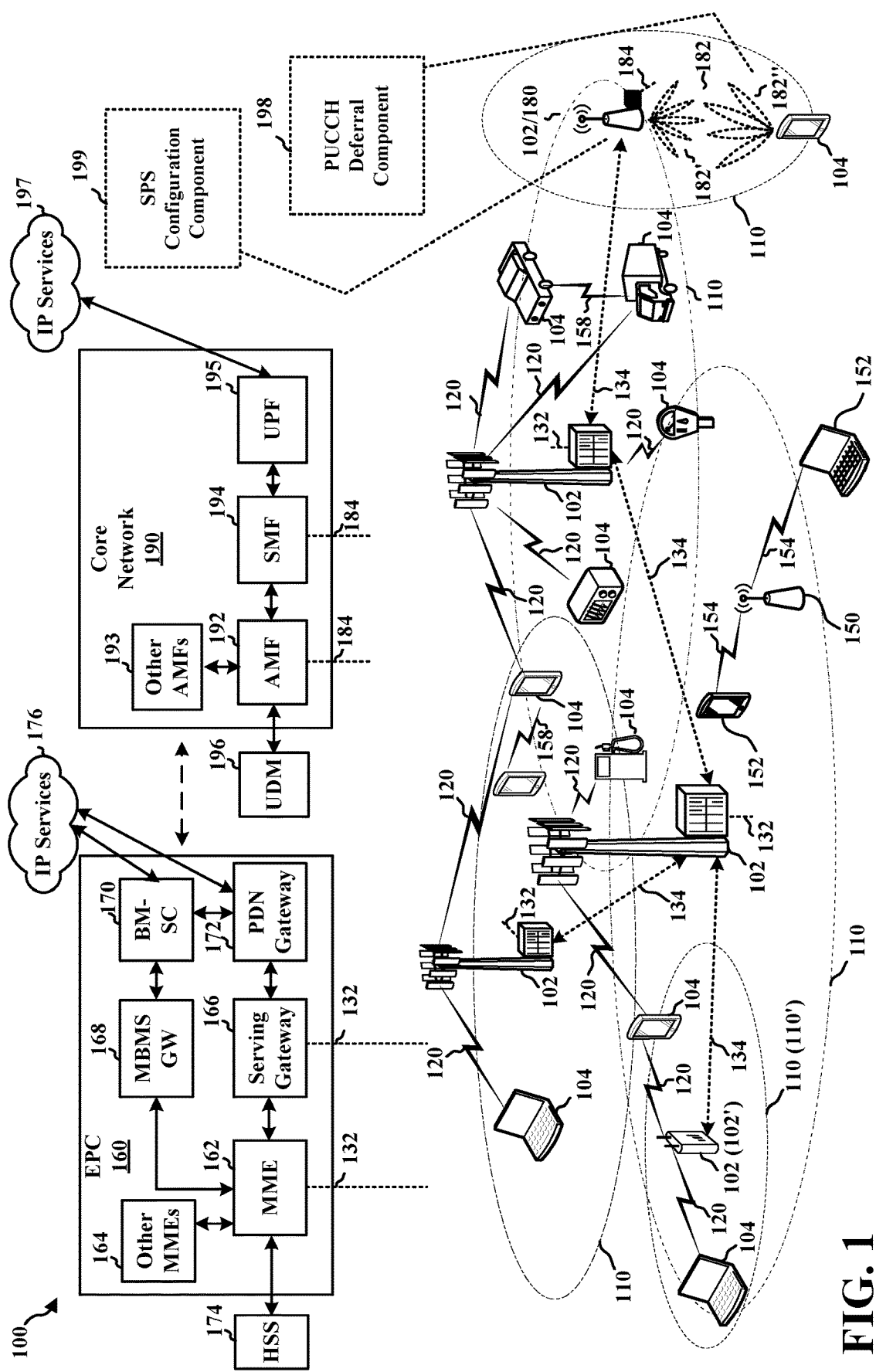
FIG. 1 is a diagram illustrating an example of a wireless communications system and an access network.

In wireless communication systems, base stations may transmit semi-persistent downlink packets or signals to the user equipment (UE). The downlink packets may be transmitted on physical downlink shared channel (PDSCH) that may carry the downlink packets. In response, the UE may provide a HARQ acknowledgment or negative acknowledgment (ACK/NACK) feedback for each of the plurality of downlink packets received at the UE. Specifically, the UE may provide HARQ-ACK/NACK feedback that includes ACK message (e.g., if the UE decodes the received PDSCH signal correctly), a NACK message (e.g., if the UE fails to receive the PDSCH signal), or discontinuous transmission (DTX) signaling (e.g., if UE receives the downlink packet/

PDSCH was received, but the UE may have incorrectly detected the PDSCH signal). Thus, in such instance, if the UE decodes the signal incorrectly (e.g., cyclic redundancy check (CRC) error), the UE may send a DTX signal.

Typically, the UE may report the HARQ-ACK/NACK within K1 slots (e.g., 1 slot) of receiving the downlink packet. However, in cases of semi-persistent scheduling (SPS) PDSCH, there may be instances of collision between the uplink transmission of the HARQ-ACK/NACK and a downlink packet transmitted by the base station during the same transmission opportunity. In other words, the HARQ-ACK/NACK feedback may be interfered by the downlink transmission during the same time slot.

In some instances, following a collision, the UE may delay or defer the HARQ-ACK/NACK feedback associated with the received downlink packet to the next uplink (UL) grant physical uplink control channel (PUCCH) occasion. For example, following a collision in the K1 slot period after receiving the downlink packet in slot 0, the UE may defer to delay transmission of HARQ-ACK/NACK feedback until slot 11 when an uplink grant PUCCH occasion arises.

The UE achieves the deferred transmission by delaying the SPS PUCCH HARQ to the first available PUCCH. For example, each of a plurality of SPS downlink packets or PDSCH signals may trigger a HARQ-ACK/NACK feedback reporting from the UE during the first available PUCCH. This may imply that the physical resource identifier scheduled for the SPS PUCCH may be reserved up to a maximum deferral time. Logically, in most aspects, the maximum deferral time may be associated with the DL packet expiration. In some aspects, the maximum deferral time may be linked with the SPS periodicity. In other aspects, reserving an unused uplink resource for a relatively short period of time (e.g., when the maximum deferral time is about 1 ms) is desirable.

However, while the above techniques of deferring a subset of the plurality of HARQ-ACK/NACK feedback may increase reliability, such techniques also delay the transmission of HARQ-ACK/NACK feedback beyond an undesirable time length. For example, in some scenarios, where a SPS PDSCH packet associated with a SPS PDSCH configuration is received at the UE following a number of prior PDSCH packets, the transmission of the HARQ-ACK/NACK feedback may be delayed in time until at least a next available uplink slot becomes available in order to maximize bandwidth utilization. In some use cases (e.g., when the packet expiration, or the SPS period is equal to 4 ms), reserving an unused resource for up to 4 msec may not be desirable. Such latency may adversely impact low latency/high priority communications. In other aspects, retransmitting a relatively short DL packet is not as adversely impactful compared to retransmitting a relatively large packet in the use case of SPS PUCCH HARQ collisions with DL symbols.

Aspects of the present disclosure solve the above-identified problem by providing techniques for robust transmissions of HARQ-ACK/NACK feedback based on different SPS configurations associated with at least SPS downlink packets received at the UE for one or more PUCCH groups. Specifically, in accordance with aspects of the present disclosure, each of the one or more SPS PDSCH configurations may indicate whether a corresponding HARQ-ACK/NACK feedback associated with the PDSCH received at the UE is configured for deferral upon collision, and if a PUCCH transmission consists of HARQ-ACK for at least one SPS PDSCH configuration with deferral, the PUCCH transmission is to be deferred to the first available PUCCH.

Thus, in some scenarios, the base station may configure the UE for an SPS PDSCH configuration with deferral and an SPS PDSCH configuration without deferral. In this regard, the UE may defer all bits of the SPS PUCCH HARQ codebook.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various aspects are now described in more detail with reference to the FIGS. 1-7. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an PUCCH deferral component 198 that is configured to receive, from a base station, a plurality of semi-persistent scheduling (SPS) configurations, wherein each of the plurality of SPS configurations is associated with a received SPS downlink packet. The PUCCH deferral component 198 is also configured to determine whether at least one SPS configuration of the plurality of SPS configurations indicates that a hybrid repeat request (HARQ) feedback associated with the received SPS downlink packet is configured for deferral. The PUCCH deferral component 198 is also configured to delay transmission of each HARQ feedback associated with different SPS downlink packets when the at least one SPS configuration indicates that the HARQ feedback associated with the received SPS downlink packet is configured for deferral.

In another configuration, the PUCCH deferral component 198 is configured to receive, from a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral. The PUCCH deferral component 198 is also configured to delay transmission of the first HARQ feedback payload and the second HARQ feedback payload based on different configurations for HARQ feedback deferral between the first SPS downlink packet and the second SPS downlink packet.

Referring still to FIG. 1, in certain aspects, the base station 102/180 may include an SPS configuration component 199 that is configured to transmit, to a user equipment (UE), a plurality of semi-persistent scheduling (SPS) configurations, in which each of the plurality of SPS configurations is associated with an SPS downlink packet. In some aspects, at least one SPS configuration of the plurality of SPS configurations indicates whether a hybrid repeat request (HARQ) feedback associated with the SPS downlink packet is configured for deferral. The SPS configuration component 199 is also configured to receive, from the UE, a delayed transmission of each HARQ feedback associated with different SPS downlink packets when the at least one SPS configuration indicates that the HARQ feedback associated with the SPS downlink packet is configured for deferral.

In another configuration, the SPS configuration component 199 is configured to transmit, to a user equipment (UE), a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral. The SPS configuration component 199 is also configured to receive, from the UE, a delayed transmission of the first HARQ feedback payload and the second HARQ feedback payload based on different configurations for HARQ feedback deferral between the first SPS downlink packet and the second SPS downlink packet.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

In uplink repetitions, two PUCCH sequences may overlap with one another over at least one slot (e.g., in a slot-based procedure). A UE may be configured to transmit PUCCH in a set of symbols, and the UE may detect a dynamic grant (e.g., DCI 2_0) indicating a subset of the set of symbols as a downlink data transmission or other flexible downlink signaling. In other examples, the UE may detect other types of DCI (e.g., DCI 1_0/1_1/0_1) indicating CSI-RS or PDSCH in a subset of the set of symbols. In some approaches of facilitating uplink repetitions, after some processing time (e.g., about two symbols from end of DCI) to decode the DCI associated with the PDSCH, for example, the UE may cancel (or drop) the PUCCH from the subset of symbols. In some examples, in the case of a PUCCH repetition, the UE may only cancel the PUCCH repetition overlapped with a DG PDSCH. In some aspects, the UE may avoid SPS HARQ-ACK dropping for TDD due to a potential PUCCH collision with at least one downlink symbol or flexible symbol. In some aspects, a dropped SPS ACK/NACK signal due to a dynamic SFI or dynamic grant (DG), a semi-static TDD can be retransmitted by the UE. As described above, when an SPS-based uplink repetition carrying HARQ-ACK information overlaps with a DG PDSCH, the uplink repetition is dropped. However, this approach in handling overlapped uplink repetitions with SPS HARQ-ACK information requires additional resources to retransmit downlink data when a dropped uplink repetition carries SPS HARQ-ACK information.

The subject technology provides for delaying transmission of uplink repetitions, including both dropped and remaining uplink repetitions. In this regard, the subject technology increases the efficiency and reliability of uplink repetition transmissions by facilitating the delay of overlapped uplink repetitions with SPS HARQ-ACK information.

Figure 3:
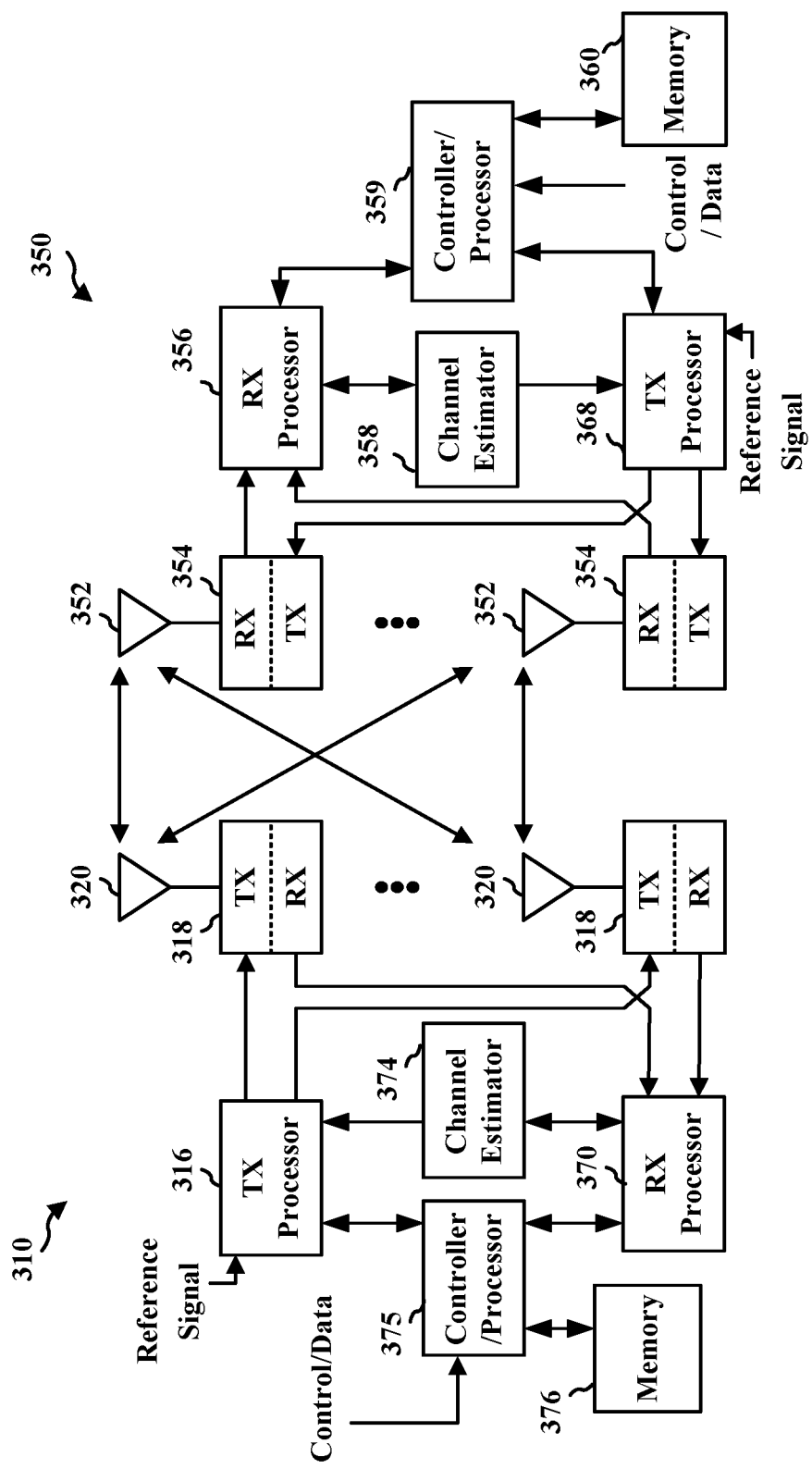
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
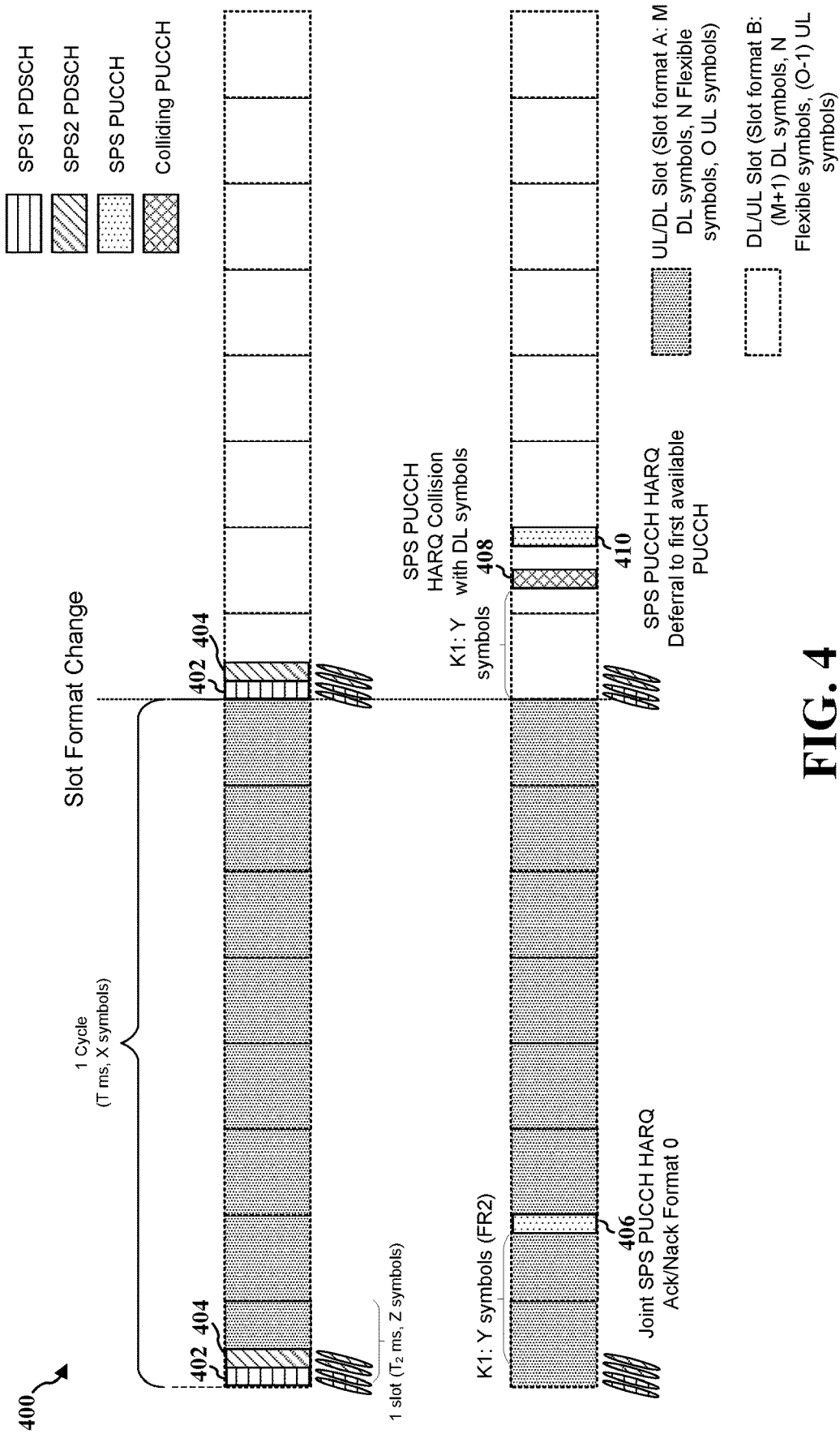
FIG. 4 is a diagram illustrating an example of an uplink repetition sequence with a dropped repetition, in accordance with some aspects of the present disclosure.

FIG. 4 is a timing diagram 400 for SPS PDSCH transmissions (e.g., SPS1 PDSCH, SPS2 PDSCH), where subsequent downlink symbols (after a slot format change) may cause a collision with uplink transmission of the HARQ-ACK/NACK (e.g., colliding PUCCH), in accordance with some aspects of the present disclosure. The timing diagram 400 includes a first SPS PDSCH 402, a second SPS PDSCH 404, a joint SPS PUCCH HARQ 406, a SPS PUCCH HARQ 408, and a deferred SPS PUCCH HARQ 410. As illustrated in FIG. 4, there are two simultaneous SPS configurations. The first SPS PDSCH 402 may be configured with two symbols PDSCH and with a K1 parameter of 20 symbols for the SPS 1 PUCCH HARQ-ACK/NACK. The second SPS PDSCH 404 may be configured with two symbols PDSCH and with a K1 parameter of 20 symbols for the SPS 2 PUCCH HARQ-ACK/NACK. The HOT cycle for both SPS configurations may be about 1 ms, respectively, each cycle includes about 112 symbols. Prior to the slot format change, each slot corresponds to an uplink/downlink slot format with M downlink symbols (e.g., 11 downlink symbols), N flexible symbols (e.g., 1 flexible symbol), and O uplink symbols (e.g., 2 uplink symbols). After the slot format change, each slot corresponds to a downlink/uplink slot format with M+1 downlink symbols (e.g., 12 downlink symbols), N flexible symbols, and O-1 uplink symbols (e.g., 1 uplink symbol).

Specifically, as noted above, in wireless communication systems, base stations may transmit SPS downlink packets or signals (e.g., SPS PDSCH packets 402, 404, etc.) to the UE. The SPS PDSCH downlink packets (or downlink packets broadly) may be transmitted on the PDSCH. In response, the UE may provide a HARQ-ACK/NACK feedback for each of the plurality of downlink packets received at the UE. Specifically, the UE may provide HARQ-ACK/NACK feedback that includes ACK message (e.g., if the UE decodes the received PDSCH signal correctly) or a NACK message (e.g., if the UE fails to receive the PDSCH signal).

The UE may be configured to report the HARQ-ACK/NACK feedback within K1 slots (e.g., number of slots after receiving the PDSCH downlink packet). An SPS PDSCH configuration may contains a plurality of SPS PDSCH occasions. Each SPS PDSCH configuration be configured with specific periodicity (p) and parameter K1, the values of one or more of parameters (p, K1) may be configured for each SPS PDSCH configuration separately by the base station. For example, the first PDSCH downlink packet 402 may be received in a first SPS PDSCH configuration (interchangeably referred to as downlink or time "slot") and the second PDSCH downlink packet 404 may be received in a second SPS PDSCH configuration. The UE may be configured to report a joint HARQ-ACK/NACK feedback within two slots (e.g., K1=2) of the UE receiving the first PDCH downlink packet 402. In other words, the UE may be configured to transmit the HARQ-ACK/NACK feedback (e.g., the joint SPS PUCCH HARQ 406) at about 20 symbols following reception of the first PDSCH downlink packet 402.

However, there may be instances of collision between the uplink transmission of the HARQ-ACK/NACK feedback and another downlink packet transmitted by the UE during the same transmission opportunity. For example, as illustrated, with respect to first PDSCH downlink packet 402 and the second PDSCH downlink packet 404 after to the slot format change, the HARQ-ACK/NACK feedback transmission by the UE during a second slot may collide with the scheduled downlink traffic (e.g., SPS PUCCH HARQ 408). Thus, as illustrated in timing diagram 400, the UE may not use the configured K1 slot for transmission of the joint HARQ-ACK/NACK feedback associated with the first SPS PDSCH 402 and the second SPS PDSCH 404 since the subsequent transmission opportunity collides with downlink traffic in the same slot.

In order to address the collision of UE transmission of the HARQ-ACK/NACK feedback associated with first SPS PDSCH 402 and the second SPS PDSCH 404, the UE may defer the HARQ-ACK/NACK feedback reporting and channel control information of the downlink packets to the next available uplink grant. For example, the UE may transmit the SPS PUCCH HARQ 410 at the next available PUCCH slot.

In some aspects, the SPS configurations from the base station may be signaled via radio resource control (RRC), media access control element (MAC-CE), or dynamic DCI signals received at the UE from the base station.

Figure 5:
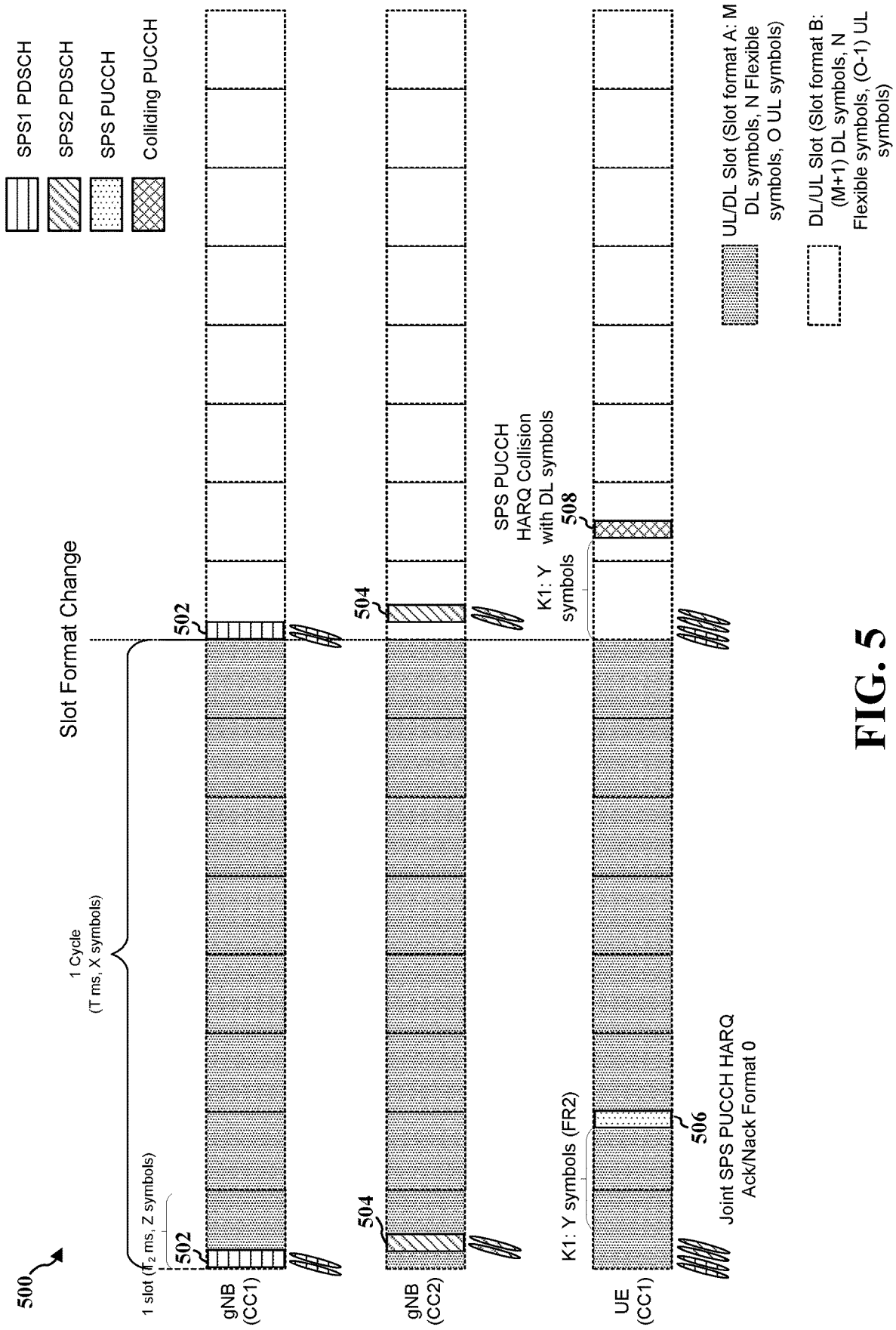
FIG. 5 is a diagram illustrating an example of a transmitted uplink repetition sequence, in accordance with some aspects of the present disclosure.

FIG. 5 is a timing diagram 500 for SPS PDSCH transmissions (e.g., SPS1 PDSCH, SPS2 PDSCH), where subsequent downlink symbols (after a slot format change) may cause a collision with uplink transmission of the HARQ-ACK/NACK (e.g., colliding PUCCH), in accordance with some aspects of the present disclosure. The timing diagram 500 includes a first SPS PDSCH 502, a second SPS PDSCH 504, a joint SPS PUCCH HARQ 506, and a SPS PUCCH HARQ 508. As illustrated in FIG. 5, there are two simultaneous SPS configurations. The first SPS PDSCH 502 may be configured with two symbols PDSCH and with a K1 parameter of 20 symbols for the SPS 1 PUCCH HARQ-ACK/NACK. The second SPS PDSCH 504 may be configured with two symbols PDSCH and with a K1 parameter of 20 symbols for the SPS 2 PUCCH HARQ-ACK/NACK. The IIOT cycle for both SPS configurations may be about 1 ms, respectively, each cycle includes about 112 symbols. As illustrated in FIG. 5, the first SPS PDSCH 502 and the second SPS PDSCH 504 are transmitted on different component carriers (e.g., CC1, CC2) by the base station. In contrast to FIG. 4, the SPS 1 HARQ bits associated with the first SPS PDSCH 502 are configured for deferral upon collision, whereas the SPS 2 HARQ bits associated with the second SPS PDSCH 504 are not configured for deferral.

In order to address the collision of UE transmission of the HARQ-ACK/NACK feedback associated with the first SPS PDSCH 502, the UE may defer the HARQ-ACK/NACK feedback reporting and channel control information of the downlink packets to the next available uplink grant. For example, the UE may transmit a deferred SPS PUCCH HARQ (not shown) at the next available PUCCH slot. However, since the HARQ-ACK/NACK feedback associated with the second SPS PDSCH 504 is not configured for deferral upon collision, the UE may drop the SPS PUCCH HARQ 508.

Figure 6:
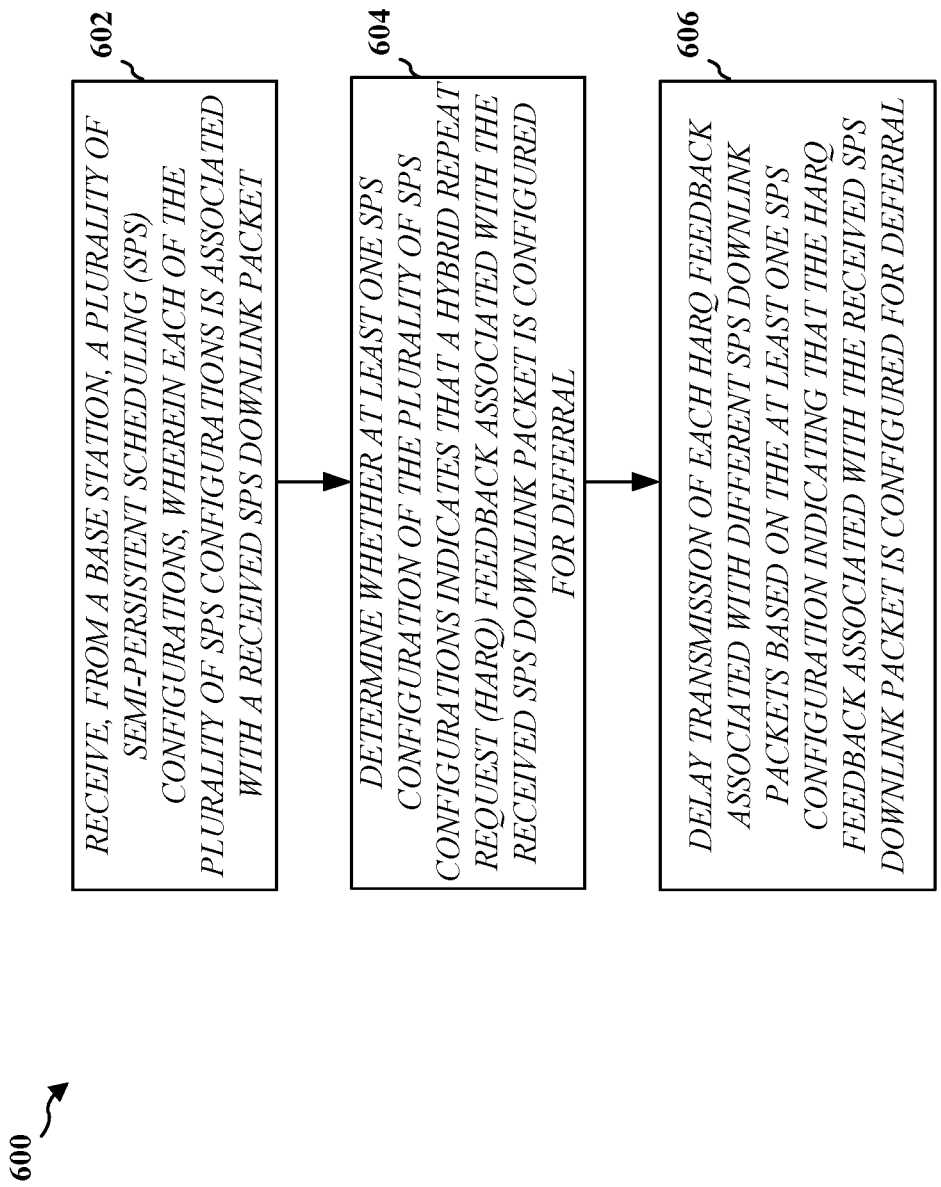
FIG. 6 is a flowchart of a process of wireless communication for SPS PUCCH HARQ deferral for PUCCH groups at a user equipment, in accordance with some aspects of the present disclosure.

FIG. 6 is a flowchart of a process 600 of wireless communication for SPS PUCCH HARQ deferral for PUCCH groups at a user equipment, in accordance with some aspects of the present disclosure. The process 600 may be performed by a user equipment (e.g., the UE 104; UE 350, the RSU 107). As illustrated, the process 600 includes a number of enumerated steps, but embodiments of the process 600 may include additional steps before, after, and in between the enumerated steps. In some embodiments, one or more of the enumerated steps may be omitted or performed in a different order.

At 602, the user equipment may receive, from a base station, a plurality of semi-persistent scheduling (SPS) configurations, in which each of the plurality of SPS configurations is associated with a received SPS downlink packet. The user equipment can receive the SPS configurations, e.g., as described in connection with FIGS. 1-5. For instance, 602 may be performed by one or more components described with respect to FIG. 3, e.g., processor 359, receive processor 356, receiver/transmitter 354 and/or antenna 352. The SPS configurations may be received, e.g., by the SPS processing component 1044 via the reception component 1030 of the apparatus 1002 in FIG. 10.

At 604, the user equipment may determine whether at least one SPS configuration of the plurality of SPS configurations indicates that a hybrid repeat request (HARQ) feedback associated with the received SPS downlink packet is configured for deferral. For example, the at least one SPS configuration may include an spsHARQdeferral parameter that indicates whether the HARQ feedback is configured for deferral. In some aspects, for SPS HARQ-ACK deferral, SPS HARQ bits subject to deferral from the HARQ-ACK codebook from an initial PUCCH slot are deferred to the target PUCCH slot. For example, the UE may determine an earliest next PUCCH slot and determine a PUCCH with HARQ-ACK bits that correspond only to SPS configurations with the spsHARQdeferral parameter being provided therein. The user equipment can determine whether the SPS HARQ feedback is configured for deferral, e.g., as described in connection with FIGS. 1-5. For instance, 604 may be performed by one or more components described with respect to FIG. 3, e.g., processor 359, and/or receive processor 356. The determination can be performed, e.g., by the deferring component 1042 through the determination component 1040 of the apparatus 1002 in FIG. 10.

At 606, the user equipment may delay transmission of each HARQ feedback associated with different SPS downlink packets based on the at least one SPS configuration indicating that the HARQ feedback associated with the received SPS downlink packet is configured for deferral. In this regard, the SPS HARQ bits that correspond to the SPS configuration in which SPS HARQ deferral is activated are deferred. In some examples, when there is a collision with SPS HARQ bits that originate from SPS configurations with deferral activated and deactivated, only those SPS HARQ bits from the SPS configured for deferral are indeed deferred. The bits of the SPS configuration that is not configured with SPS HARQ deferral are not deferred. The user equipment can delay the HARQ feedback uplink transmission, e.g., as described in connection with FIGS. 1-5. For instance, 606 may be performed by one or more components described with respect to FIG. 3, e.g., processor 359, transmit processor 356, receiver/transmitter 354 and/or antenna 352. The HARQ feedback may be delayed, e.g., by the deferring component 1042 and the HARQ component 1046 of the apparatus 1002 in FIG. 10.

In some aspects, the UE may transmit, during a first uplink slot, the HARQ feedback associated with the received SPS downlink packet when the least one SPS configuration indicates that the HARQ feedback associated with the received SPS downlink packet is configured for deferral.

In some aspects, the plurality of SPS configurations includes a first SPS configuration that indicates that the HARQ feedback associated with a first received SPS downlink packet is not configured for deferral and a second SPS configuration that indicates that the HARQ feedback associated with a second received SPS downlink packet is configured for deferral, in which the HARQ feedback associated with the first received SPS downlink packet and the second received SPS downlink packet is delayed.

In some aspects, the delaying includes deferring all bits of an SPS physical uplink control channel (PUCCH) HARQ codebook.

In some aspects, the SPS PUCCH HARQ codebook corresponds to a PUCCH resource identifier of a PUCCH resource set that is agreed between the UE and the base station.

In some aspects, a number of bits of the SPS PUCCH HARQ codebook are deferred based on whether a number of codebook bits corresponding to the HARQ feedback not configured for deferral is lesser than a predetermined value.

In some aspects, the predetermined value includes a fixed number of HARQ bits, wherein all of the bits of the SPS PUCCH HARQ codebook are deferred when the number of codebook bits corresponding to the HARQ feedback are less than the fixed number of HARQ bits.

In some aspects, the predetermined value includes a fixed percentage value of a total amount of HARQ bits in the SPS PUCCH HARQ codebook, wherein all of the bits of the SPS PUCCH HARQ codebook are deferred when the number of codebook bits corresponding to the HARQ feedback are less than the fixed percentage value of the total amount of HARQ bits.

In some aspects, no bits of the SPS PUCCH HARQ codebook are deferred when the number of codebook bits corresponding to the HARQ feedback not configured for deferral is not less than the predetermined value.

In some aspects, at least one of the plurality of SPS configurations allows for deferral of, at least in part, an SPS physical uplink control channel (PUCCH) HARQ codebook based on whether a resulting SPS PUCCH HARQ codebook corresponds to a single PUCCH resource identifier in a resulting PUCCH resource set.

In some aspects, at least one of the plurality of SPS configurations configures the UE to not defer any bit in an SPS physical uplink control channel (PUCCH) HARQ codebook based on an uplink loading exceeding a load threshold.

In some aspects, the plurality of SPS configurations are received at the UE via one or more of radio resource control (RRC), media access control element (MAC-CE), or dynamic downlink control information (DCI) signals.

In some aspects, each of the plurality of SPS configurations is associated with a same physical uplink control channel (PUCCH) group.

In some aspects, the plurality of SPS configurations is associated with a common physical uplink control channel (PUCCH) group, in which the plurality of SPS configurations comprises a first SPS configuration indicating HARQ feedback corresponding to a first SPS downlink transmission not configured for deferral and a second SPS configuration indicating HARQ feedback corresponding to a second SPS downlink transmission configured for deferral.

In some aspects, the UE may transmit, to the base station, an uplink message indicating a request to modify a PUCCH group configuration for the UE based on the first SPS configuration and the second SPS configuration. In some aspects, the UE may receive, from the base station, a modification in the PUCCH group configuration that indicates the first SPS configuration and the second SPS configuration corresponding to different PUCCH groups.

In some aspects, the uplink message corresponds to one or more of uplink control information (UCI) or media access control element (MAC-CE) signals, wherein the UCI comprises a special scheduling request.

In some aspects, the received SPS downlink packet comprises an SPS physical downlink shared channel (PDSCH).

Figure 7:
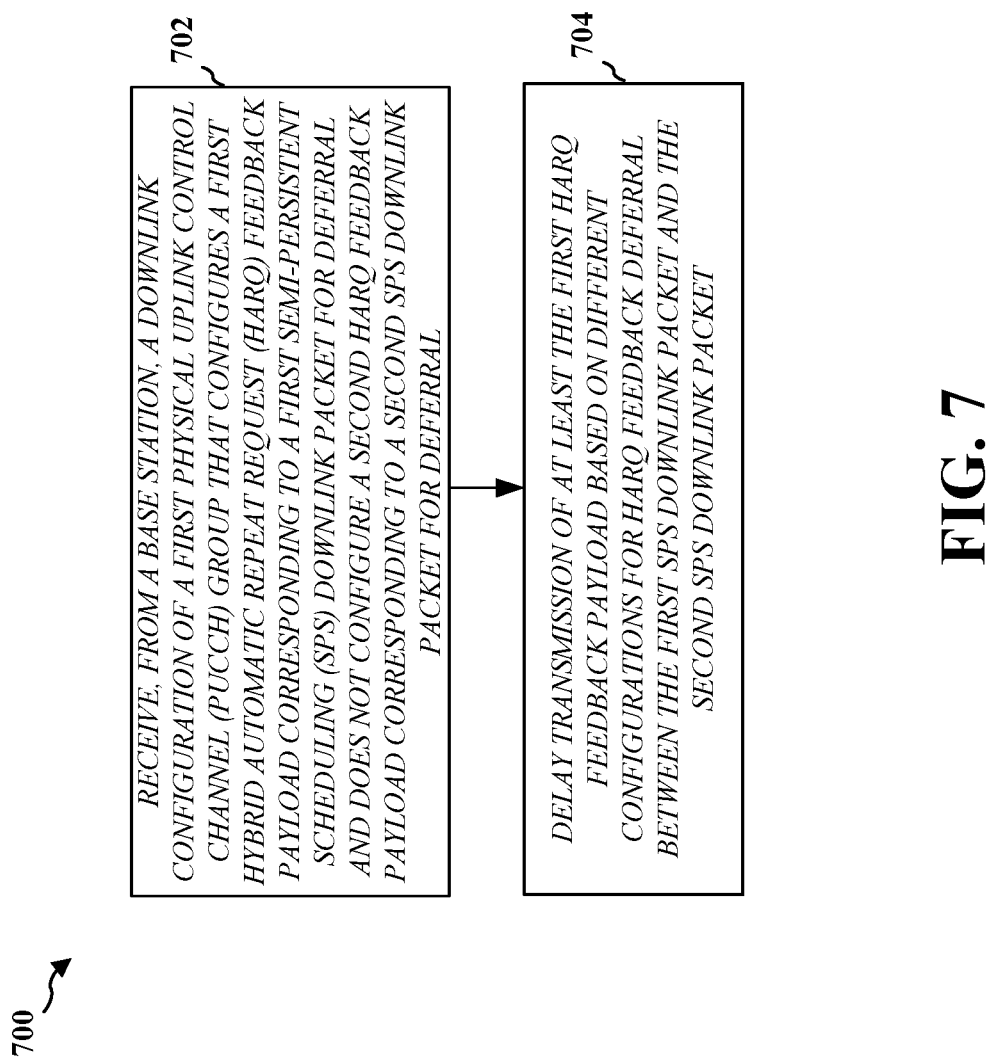
FIG. 7 is a flowchart of another process of wireless communication for SPS PUCCH HARQ deferral for PUCCH groups at a user equipment, in accordance with some aspects of the present disclosure.

FIG. 7 is a flowchart of another process 700 of wireless communication for SPS PUCCH HARQ deferral for PUCCH groups at a user equipment, in accordance with some aspects of the present disclosure. The process 700 may be performed by a user equipment (e.g., the UE 104; UE 350, the RSU 107). As illustrated, the process 700 includes a number of enumerated steps, but embodiments of the process 700 may include additional steps before, after, and in between the enumerated steps. In some embodiments, one or more of the enumerated steps may be omitted or performed in a different order.

At 702, the user equipment may receive, from a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral. The user equipment can receive the downlink configuration, e.g., as described in connection with FIGS. 1-5. For instance, 702 may be performed by one or more components described with respect to FIG. 3, e.g., processor 359, receive processor 356, receiver/transmitter 354 and/or antenna 352. The downlink configuration may be received, e.g., by the SPS processing component 1044 via the reception component 1030 of the apparatus 1002 in FIG. 10.

At 704, the user equipment may delay transmission of at least the first HARQ feedback payload based on different configurations for HARQ feedback deferral between the first SPS downlink packet and the second SPS downlink packet. The user equipment can delay the HARQ feedback uplink transmission, e.g., as described in connection with FIGS. 1-5. For instance, 704 may be performed by one or more components described with respect to FIG. 3, e.g., processor 359, transmit processor 356, receiver/transmitter 354 and/or antenna 352. The HARQ feedback may be delayed, e.g., by the deferring component 1042 and the HARQ component 1046 of the apparatus 1002 in FIG. 10.

Figure 8:
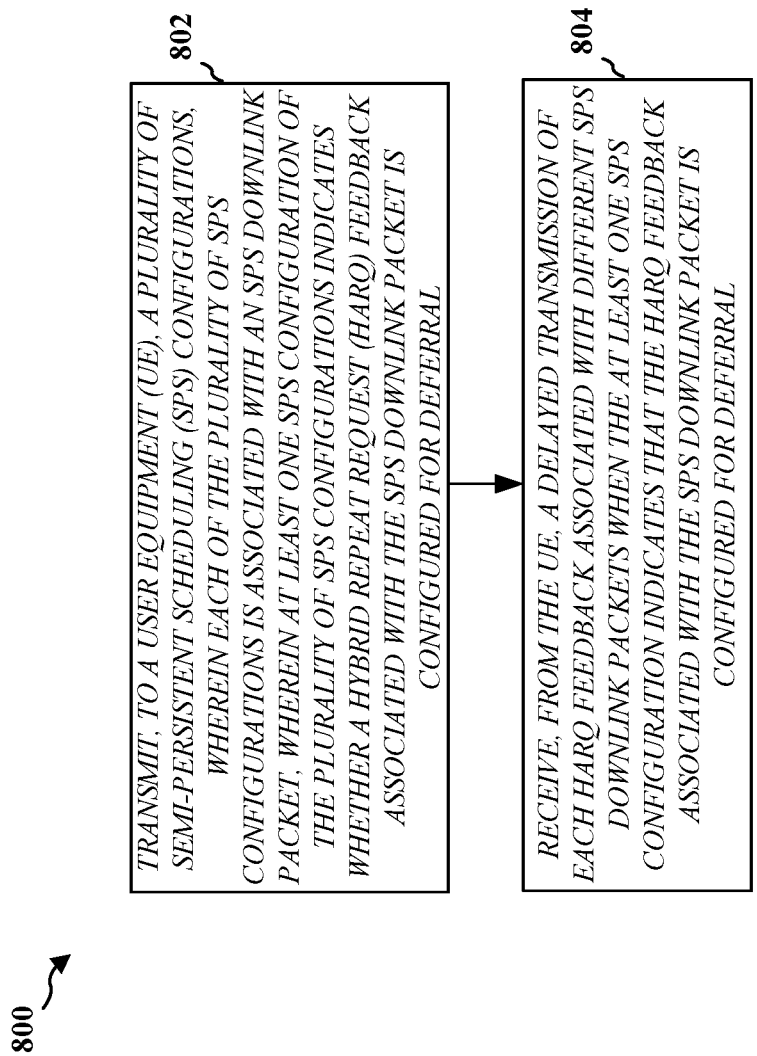
FIG. 8 is a flowchart of a process of wireless communication for SPS PUCCH HARQ deferral for PUCCH groups at a base station, in accordance with some aspects of the present disclosure.

FIG. 8 is a flowchart of a process 800 of wireless communication for SPS PUCCH HARQ deferral for PUCCH groups at a base station, in accordance with some aspects of the present disclosure. The process 800 may be performed by a base station (e.g., the BS 102, 180; base station 310). As illustrated, the process 800 includes a number of enumerated steps, but embodiments of the process 800 may include additional steps before, after, and in between the enumerated steps. In some embodiments, one or more of the enumerated steps may be omitted or performed in a different order.

At 802, the base station may transmit, to a UE over a downlink channel, a plurality of semi-persistent scheduling (SPS) configurations, in which each of the plurality of SPS configurations is associated with an SPS downlink packet. In some aspects, at least one SPS configuration of the plurality of SPS configurations indicates whether a hybrid repeat request (HARQ) feedback associated with the SPS downlink packet is configured for deferral. The base station can transmit the SPS configurations, e.g., as described in connection with FIGS. 1-5. For instance, 802 may be performed by one or more components described with respect to FIG.

3, e.g., processor 375, transmit processor 316, receiver/transmitter 318 and/or antenna 320. The SPS configurations may be transmitted, e.g., by the SPS configuration component 1140 and/or the deferral configuration component 1044 via the transmission component 1134 of the apparatus 1102 in FIG. 11.

At 804, the base station may receive, from the UE, a delayed transmission of each HARQ feedback associated with different SPS downlink packets when the at least one SPS configuration indicates that the HARQ feedback associated with the SPS downlink packet is configured for deferral. The base station can receive the delayed transmission of the HARQ feedback, e.g., as described in connection with FIGS. 1-5. For instance, 804 may be performed by one or more components described with respect to FIG. 3, e.g., processor 375, receive processor 370, receiver/transmitter 318 and/or antenna 320. The delayed HARQ feedback may be received, e.g., by the HARQ processing component 1146 and/or the determination component 1042 via the reception component 1130 of the apparatus 1102 in FIG. 11.

Figure 9:
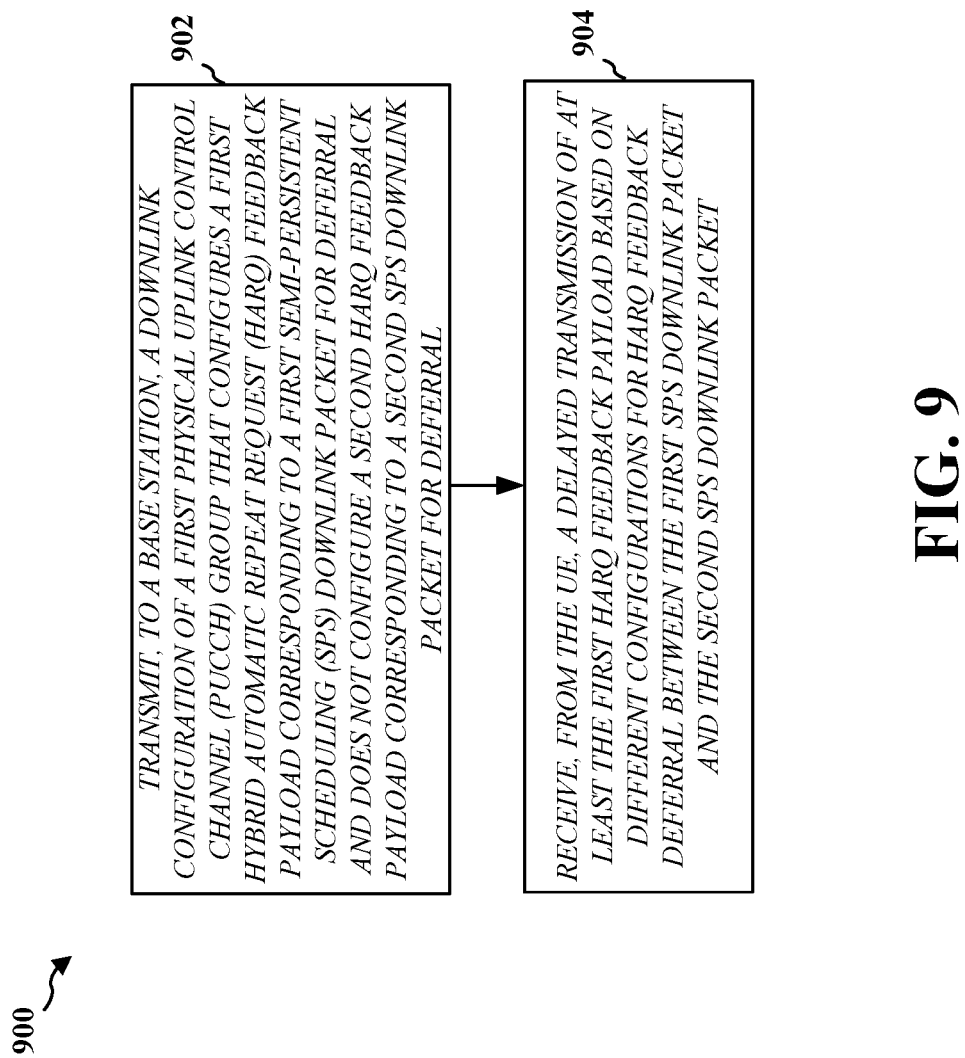
FIG. 9 is a flowchart of another process of wireless communication for SPS PUCCH HARQ deferral for PUCCH groups at a base station, in accordance with some aspects of the present disclosure.

FIG. 9 is a flowchart of another process 900 of wireless communication for SPS PUCCH HARQ deferral for PUCCH groups at a base station, in accordance with some aspects of the present disclosure. The process 900 may be performed by a base station (e.g., the BS 102, 180; base station 310). As illustrated, the process 900 includes a number of enumerated steps, but embodiments of the process 900 may include additional steps before, after, and in between the enumerated steps. In some embodiments, one or more of the enumerated steps may be omitted or performed in a different order.

At 902, the base station may transmit, to a user equipment (UE), a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral. The base station can transmit the downlink configuration, e.g., as described in connection with FIGS. 1-5. For instance, 802 may be performed by one or more components described with respect to FIG. 3, e.g., processor 375, transmit processor 316, receiver/transmitter 318 and/or antenna 320. The downlink configuration may be transmitted, e.g., by the SPS configuration component 1140 and/or the deferral configuration component 1044 via the transmission component 1134 of the apparatus 1102 in FIG. 11.

At 904, the base station may receive, from the UE, a delayed transmission of the first HARQ feedback payload and the second HARQ feedback payload based on different configurations for HARQ feedback deferral between the first SPS downlink packet and the second SPS downlink packet. The base station can receive the delayed transmission of the HARQ feedback, e.g., as described in connection with FIGS. 1-5. For instance, 904 may be performed by one or more components described with respect to FIG. 3, e.g., processor 375, receive processor 370, receiver/transmitter 318 and/or antenna 320. The delayed HARQ feedback may be received, e.g., by the HARQ processing component 1146 and/or the determination component 1042 via the reception component 1130 of the apparatus 1102 in FIG. 11.

Figure 10:
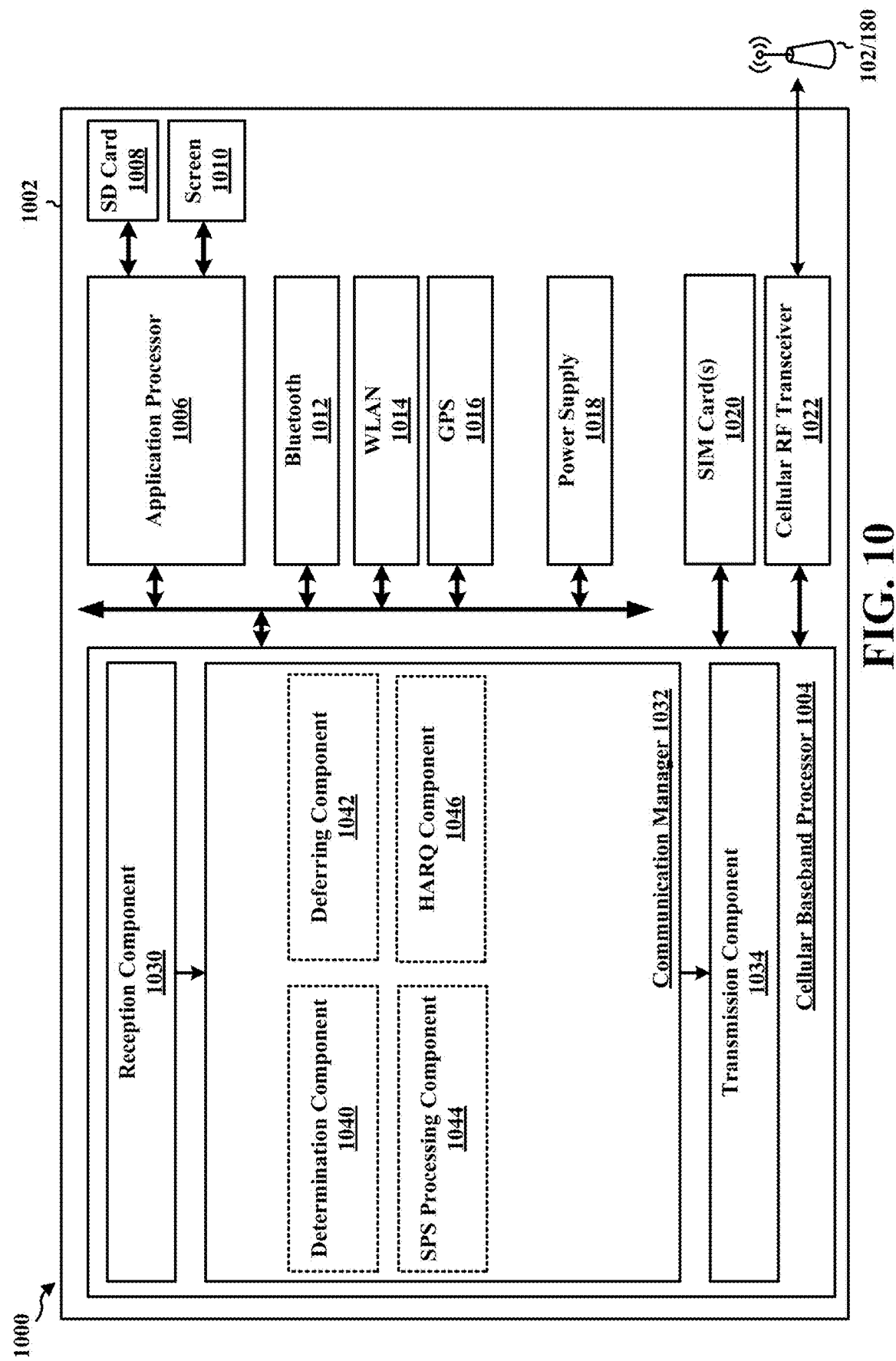
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software.

The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforementioned additional modules of the apparatus 1002.

The communication manager 1032 includes a determination component 1040, a deferring component 1042, an SPS processing component 1044 and a HARQ component 1046. The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, a plurality of semi-persistent scheduling (SPS) configurations, in which each of the plurality of SPS configurations is associated with a received SPS downlink packet; means for determining whether at least one SPS configuration of the plurality of SPS configurations indicates that a hybrid repeat request (HARQ) feedback associated with the received SPS downlink packet is configured for deferral; and means for delaying transmission of each HARQ feedback associated with different SPS downlink packets when the at least one SPS configuration indicates that the HARQ feedback associated with the received SPS downlink packet is configured for deferral.

In another configuration, the apparatus 1002, and in particular the cellular baseband processor 1004, includes means for receiving, from a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral; and means for delaying transmission of at least the first HARQ feedback payload based on different configurations for HARQ feedback deferral between the first SPS downlink packet and the second SPS downlink packet.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
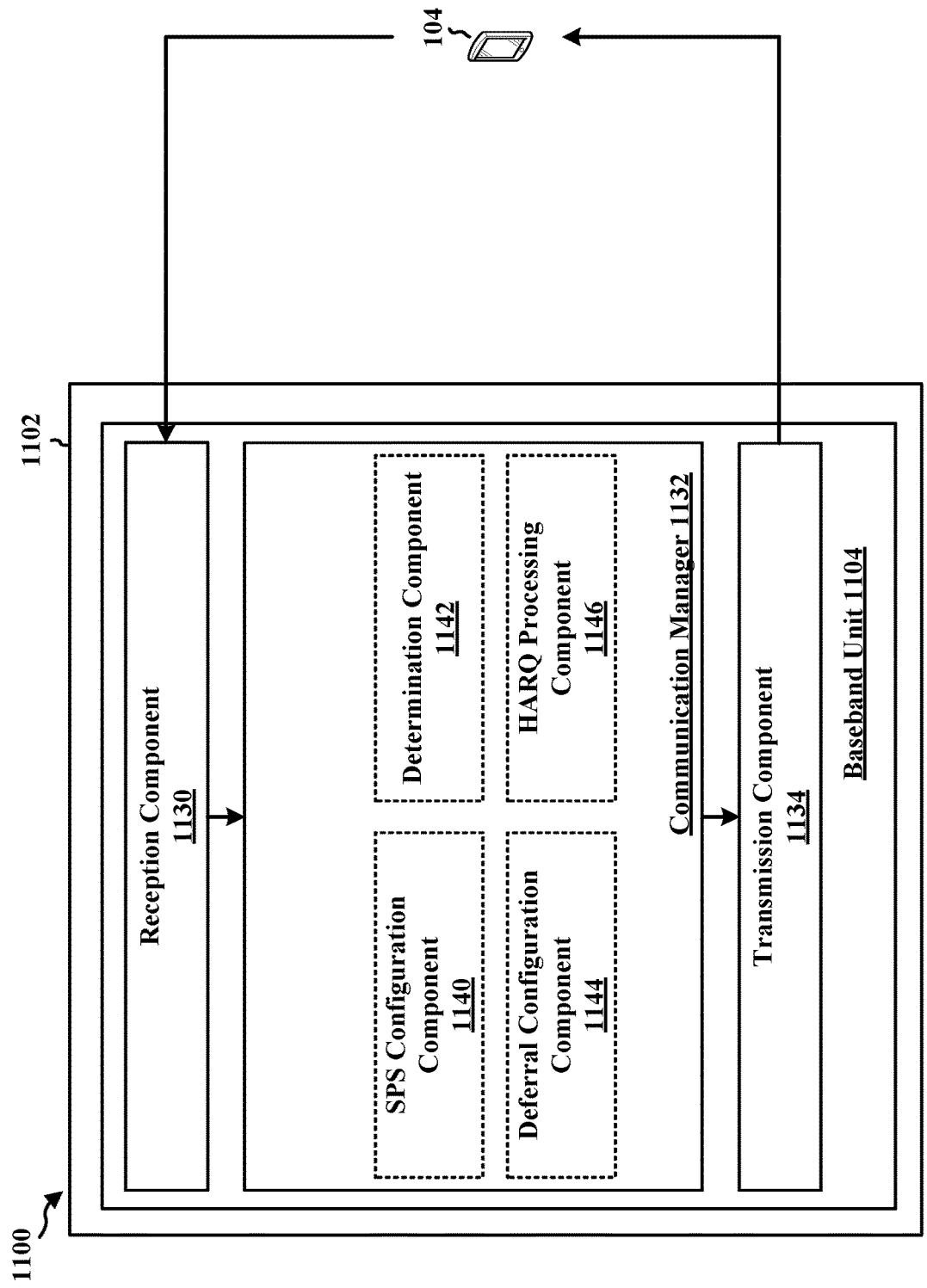
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a SPS configuration component 1140, determination component 1142, deferral configuration component 1144 and HARQ processing component 1146. The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to a user equipment (UE), a plurality of semi-persistent scheduling (SPS) configurations, wherein each of the plurality of SPS configurations is associated with an SPS downlink packet, in which at least one SPS configuration of the plurality of SPS configurations indicates whether a hybrid repeat request (HARQ) feedback associated with the SPS downlink packet is configured for deferral; and means for receiving, from the UE, a delayed transmission of each HARQ feedback associated with different SPS downlink packets when the at least one SPS configuration indicates that the HARQ feedback associated with the SPS downlink packet is configured for deferral.

In another configuration, the apparatus 1102, and in particular the baseband unit 1104, includes means for transmitting, to a user equipment (UE), a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral; and means for receiving, from the UE, a delayed transmission of at least the first HARQ feedback payload based on different configurations for HARQ feedback deferral between the first SPS downlink packet and the second SPS downlink packet.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following clauses are illustrative only and may be combined with aspects of other embodiments or teachings described herein, without limitation.

Clause 1 is a method of wireless communication performed by a user equipment (UE), the method comprising receiving, from a base station, a plurality of semi-persistent scheduling (SPS) configurations, wherein each of the plurality of SPS configurations is associated with a received SPS downlink packet; determining whether at least one SPS configuration of the plurality of SPS configurations indicates that a hybrid repeat request (HARQ) feedback associated with the received SPS downlink packet is configured for deferral; and delaying transmission of each HARQ feedback associated with different SPS downlink packets when the at least one SPS configuration indicates that the HARQ feedback associated with the received SPS downlink packet is configured for deferral.

In Clause 2, the method of Clause 1 further includes transmitting, during a first uplink slot, the HARQ feedback associated with the received SPS downlink packet when the least one SPS configuration indicates that the HARQ feedback associated with the received SPS downlink packet is configured for deferral.

In Clause 3, the method of Clause 1 or Clause 2 further includes that the plurality of SPS configurations comprises a first SPS configuration that indicates that the HARQ feedback associated with a first received SPS downlink packet is not configured for deferral and a second SPS configuration that indicates that the HARQ feedback associated with a second received SPS downlink packet is configured for deferral, wherein the HARQ feedback associated with the first received SPS downlink packet and the second received SPS downlink packet is delayed.

In Clause 4, the method of any of Clauses 1-3 further includes that the delaying comprises deferring all bits of an SPS physical uplink control channel (PUCCH) HARQ codebook.

In Clause 5, the method of Clause 4 further includes that the SPS PUCCH HARQ codebook corresponds to a PUCCH resource identifier of a PUCCH resource set that is agreed between the UE and the base station.

In Clause 6, the method of Clause 4 further includes that a number of bits of the SPS PUCCH HARQ codebook are deferred based on whether a number of codebook bits corresponding to the HARQ feedback not configured for deferral is lesser than a predetermined value.

In Clause 7, the method of Clause 6 further includes that the predetermined value comprises a fixed number of HARQ bits, wherein all of the bits of the SPS PUCCH HARQ codebook are deferred when the number of codebook bits corresponding to the HARQ feedback are less than the fixed number of HARQ bits.

In Clause 8, the method of Clause 6 further includes that the predetermined value comprises a fixed percentage value of a total amount of HARQ bits in the SPS PUCCH HARQ codebook, wherein all of the bits of the SPS PUCCH HARQ codebook are deferred when the number of codebook bits corresponding to the HARQ feedback are less than the fixed percentage value of the total amount of HARQ bits.

In Clause 9, the method of Clause 6 further includes that no bits of the SPS PUCCH HARQ codebook are deferred when the number of codebook bits corresponding to the HARQ feedback not configured for deferral is not less than the predetermined value.

In Clause 10, the method of any of Clauses 1-9 further includes that at least one of the plurality of SPS configurations allows for deferral of, at least in part, an SPS physical uplink control channel (PUCCH) HARQ codebook based on whether a resulting SPS PUCCH HARQ codebook corresponds to a single PUCCH resource identifier in a resulting PUCCH resource set.

In Clause 11, the method of any of Clauses 1-10 further includes that at least one of the plurality of SPS configurations configures the UE to not defer any bit in an SPS physical uplink control channel (PUCCH) HARQ codebook based on an uplink loading exceeding a load threshold.

In Clause 12, the method of any of Clauses 1-11 further includes that the plurality of SPS configurations are received at the UE via one or more of radio resource control (RRC), media access control element (MAC-CE), or dynamic downlink control information (DCI) signals.

In Clause 13, the method of any of Clauses 1-12 further includes that each of the plurality of SPS configurations is associated with a same physical uplink control channel (PUCCH) group.

In Clause 14, the method of any of Clauses 1-13 further includes that the plurality of SPS configurations is associated with a common physical uplink control channel (PUCCH) group, wherein the plurality of SPS configurations comprises a first SPS configuration indicating HARQ feedback corresponding to a first SPS downlink transmission not configured for deferral and a second SPS configuration indicating HARQ feedback corresponding to a second SPS downlink transmission configured for deferral, further comprising transmitting, to the base station, an uplink message indicating a request to modify a PUCCH group configuration for the UE based on the first SPS configuration and the second SPS configuration; and receiving, from the base station, a modification in the PUCCH group configuration that indicates the first SPS configuration and the second SPS configuration corresponding to different PUCCH groups.

In Clause 15, the method of Clause 14 further includes that the uplink message corresponds to one or more of uplink control information (UCI) or media access control element (MAC-CE) signals, wherein the UCI comprises a special scheduling request.

In Clause 16, the method of any of Clauses 1-15 further includes that the received SPS downlink packet comprises an SPS physical downlink shared channel (PDSCH).

Clause 17 is a device including one or more processors and one or more memories in electronic communication with the one or more processors storing instructions executable by the one or more processors to cause the system or apparatus to implement a method as in any of Clauses 1 to 16.

Clause 18 is a system or apparatus including means for implementing a method or realizing an apparatus as in any of Clauses 1 to 16.

Clause 19 is a non-transitory computer readable medium storing instructions executable by one or more processors to cause the one or more processors to implement a method as in any of Clauses 1 to 16.

Clause 20 is a method of wireless communication performed by a base station, the method comprising: transmitting, to a user equipment (UE), a plurality of semi-persistent scheduling (SPS) configurations, wherein each of the plurality of SPS configurations is associated with an SPS downlink packet, wherein at least one SPS configuration of the plurality of SPS configurations indicates whether a hybrid repeat request (HARQ) feedback associated with the SPS downlink packet is not configured for deferral; and receiving, from the UE, a delayed transmission of each HARQ feedback associated with different SPS downlink packets when the at least one SPS configuration indicates that the HARQ feedback associated with the SPS downlink packet is not configured for deferral.

Clause 21 is a device including one or more processors and one or more memories in electronic communication with the one or more processors storing instructions executable by the one or more processors to cause the system or apparatus to implement a method as in Clause 20.

Clause 22 is a system or apparatus including means for implementing a method or realizing an apparatus as in Clause 20.

Clause 23 is a non-transitory computer readable medium storing instructions executable by one or more processors to cause the one or more processors to implement a method as in Clause 20.

Clause 24 is a method of wireless communication performed by a user equipment (UE), the method comprising receiving, from a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral; and delaying transmission of at least the first HARQ feedback payload based on different configurations for HARQ feedback deferral between the first SPS downlink packet and the second SPS downlink packet.

Clause 25 is a device including one or more processors and one or more memories in electronic communication with the one or more processors storing instructions executable by the one or more processors to cause the system or apparatus to implement a method as in Clause 24.

Clause 26 is a system or apparatus including means for implementing a method or realizing an apparatus as in Clause 24.

Clause 27 is a non-transitory computer readable medium storing instructions executable by one or more processors to cause the one or more processors to implement a method as in Clause 24.

Clause 28 is a method of wireless communication performed by a base station, the method comprising transmitting, to a base station, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral; and receiving, from the UE, a delayed transmission of the first HARQ feedback payload and the second HARQ feedback payload based on different configurations for HARQ feedback deferral between the first SPS downlink packet and the second SPS downlink packet.

Clause 29 is a device including one or more processors and one or more memories in electronic communication with the one or more processors storing instructions executable by the one or more processors to cause the system or apparatus to implement a method as in Clause 28.

Clause 30 is a system or apparatus including means for implementing a method or realizing an apparatus as in Clause 28.

Clause 31 is a non-transitory computer readable medium storing instructions executable by one or more processors to cause the one or more processors to implement a method as in Clause 28.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more.". Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration.". Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means.". As such, no claim element is to be construed as a means plus function unless the element is expressly recited using the phrase "means for.".

What is claimed is:

1. A method of wireless communication performed by a user equipment (UE), the method comprising:
   receiving, from a network entity, a plurality of semi-persistent scheduling (SPS) configurations, wherein each of the plurality of SPS configurations is associated with a corresponding SPS downlink packet and wherein the UE is configured to transmit joint HARQ feedback for the plurality of SPS downlink packets on a physical uplink control channel (PUCCH);
   determining that at least one SPS configuration of the plurality of SPS configurations indicates that hybrid repeat request (HARQ) feedback is configured for deferral and that at least another SPS configuration of the plurality of SPS configurations indicates that HARQ feedback is not configured for deferral; and
   delaying transmission of HARQ feedback associated with the plurality of SPS downlink packets for which the UE is configured to transmit joint HARQ feedback on the PUCCH based on the at least one SPS configuration indicating that HARQ feedback is configured for deferral.

2. The method of claim 1, further comprising transmitting, during a first uplink slot, HARQ feedback associated with the SPS downlink packet corresponding to the at least one SPS configuration of the plurality of SPS configurations that indicates HARQ feedback is configured for deferral.

3. The method of claim 1, wherein the plurality of SPS configurations comprises a first SPS configuration that indicates that HARQ feedback associated with a first received SPS downlink packet is not configured for deferral and a second SPS configuration that indicates that HARQ feedback associated with a second received SPS downlink packet is configured for deferral, wherein the HARQ feedback associated with the first received SPS downlink packet and the second received SPS downlink packet is delayed.

4. The method of claim 1, wherein the delaying is further based on the at least another SPS configuration in the plurality of SPS configurations that indicates HARQ feedback is not configured for deferral.

5. The method of claim 4, wherein an SPS PUCCH HARQ codebook corresponds to a PUCCH resource identifier of a PUCCH resource set that is agreed between the UE and the network entity.

6. The method of claim 5, wherein a number of bits of the SPS PUCCH HARQ codebook is less than a predetermined value.

7. The method of claim 6, wherein the predetermined value comprises a fixed number of HARQ bits, wherein all of the bits of the SPS PUCCH HARQ codebook are deferred based on the number of codebook bits corresponding to the HARQ feedback being less than the fixed number of HARQ bits.

8. The method of claim 6, wherein the predetermined value comprises a fixed percentage value of a total amount of HARQ bits in the SPS PUCCH HARQ codebook, wherein all of the bits of the SPS PUCCH HARQ codebook are deferred based on the number of codebook bits corresponding to the HARQ feedback being less than the fixed percentage value of the total amount of HARQ bits.

9. The method of claim 6, wherein no bits of the SPS PUCCH HARQ codebook are deferred when the number of codebook bits corresponding to the HARQ feedback not configured for deferral is not less than the predetermined value.

10. The method of claim 1, wherein at least one of the plurality of SPS configurations allows for deferral of, at least in part, an SPS physical uplink control channel (PUCCH) HARQ codebook based on whether a resulting SPS PUCCH HARQ codebook corresponds to a single PUCCH resource identifier in a resulting PUCCH resource set.

11. The method of claim 1, wherein the plurality of SPS configurations are received at the UE via one or more of radio resource control (RRC), media access control element (MAC-CE), or dynamic downlink control information (DCI) signals.

12. The method of claim 1, wherein each of the plurality of SPS configurations is associated with a same physical uplink control channel (PUCCH) group.

13. The method of claim 1, wherein the plurality of SPS configurations is associated with a common physical uplink control channel (PUCCH) group, wherein the plurality of SPS configurations comprises a first SPS configuration indicating HARQ feedback corresponding to a first SPS downlink transmission not configured for deferral and a second SPS configuration indicating HARQ feedback corresponding to a second SPS downlink transmission configured for deferral, further comprising:
transmitting, to the network entity, an uplink message indicating a request to modify a PUCCH group configuration for the UE based on the first SPS configuration and the second SPS configuration; and
receiving, from the network entity, a modification in the PUCCH group configuration that indicates the first SPS configuration and the second SPS configuration corresponding to different PUCCH groups.

14. The method of claim 13, wherein the uplink message corresponds to one or more of uplink control information (UCI) or media access control element (MAC-CE) signals, wherein the UCI comprises a special scheduling request.

15. The method of claim 1, wherein the received SPS downlink packet comprises an SPS physical downlink shared channel (PDSCH).

16. The method of claim 1, wherein the delaying comprises delaying all bits in an SPS PUCCH HARQ codebook associated with the joint HARQ feedback, including a first HARQ feedback payload for an SPS downlink packet corresponding to the at least one SPS configuration that is configured for deferral and a second HARQ feedback payload for an SPS downlink packet corresponding to the at least another SPS configuration that is not configured for deferral.

17. A method of wireless communication performed by a network entity, the method comprising:
transmitting, to a user equipment (UE), a plurality of semi-persistent scheduling (SPS) configurations, wherein each of the plurality of SPS configurations is associated with a corresponding SPS downlink packet, wherein at least one SPS configuration of the plurality of SPS configurations indicates that hybrid repeat request (HARQ) feedback is configured for deferral, wherein at least another SPS configuration of the plurality of SPS configurations indicates that HARQ feedback is not configured for deferral, and wherein the network entity configures the UE to transmit joint HARQ feedback for the plurality of SPS downlink packets on a physical uplink control channel (PUCCH); and
receiving, from the UE, a delayed transmission of HARQ feedback associated with the plurality of SPS downlink packets for which the UE is configured to transmit joint HARQ feedback on the PUCCH based on the least one SPS configuration indicating that the HARQ feedback is configured for deferral.

18. The method of claim 17, further comprising receiving, during a first uplink slot, HARQ feedback associated with the SPS downlink packet corresponding to the at least one SPS configuration of the plurality of SPS configurations that indicates HARQ feedback is configured for deferral.

19. The method of claim 17, wherein the plurality of SPS configurations is associated with a common physical uplink control channel (PUCCH) group, wherein the plurality of SPS configurations comprises a first SPS configuration indicating HARQ feedback corresponding to a first SPS downlink transmission not configured for deferral and a second SPS configuration indicating HARQ feedback corresponding to a second SPS downlink transmission configured for deferral, further comprising:
receiving, from the UE, an uplink message indicating a request to modify a PUCCH group configuration for the UE based on the first SPS configuration and the second SPS configuration; and
transmitting, to the UE, a modification in the PUCCH group configuration that indicates the first SPS configuration and the second SPS configuration corresponding to different PUCCH groups.

20. The method of claim 17, wherein the delayed transmission comprises all bits in an SPS PUCCH HARQ codebook associated with the joint HARQ feedback, including a first HARQ feedback payload for an SPS downlink packet corresponding to the at least one SPS configuration that is configured for deferral and a second HARQ feedback payload for an SPS downlink packet corresponding to the at least another SPS configuration that is not configured for deferral.

21. An apparatus for wireless communication, comprising:
at least one processor;
a transceiver; and
a memory, coupled to the at least one processor and the transceiver, storing code executable by the at least one processor to cause the apparatus to:
receive, from a network entity, via the transceiver, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral, wherein the apparatus is configured to transmit joint HARQ feedback on a physical uplink control channel (PUCCH) including the first HARQ feedback payload and the second HARQ feedback payload; and delay transmission of at least the first HARQ feedback payload based on different configurations for HARQ feedback deferral between the first SPS downlink packet and the second SPS downlink packet.

22. The apparatus of claim 21, wherein the code executable by the at least one processor further causes the apparatus to transmit, via the transceiver, during a first uplink slot, the first HARQ feedback payload when the downlink configuration indicates that the first HARQ feedback payload corresponding to the first SPS downlink packet is configured for deferral.

23. The apparatus of claim 21, wherein the downlink configuration further indicates that HARQ feedback deferral for the second SPS downlink packet is not activated, wherein the delay in the transmission of the first HARQ feedback payload and the second HARQ feedback payload includes deferral of all bits of an SPS PUCCH HARQ codebook.

24. The apparatus of claim 23, wherein the SPS PUCCH HARQ codebook corresponds to a PUCCH resource identifier of a PUCCH resource set that is agreed between the apparatus and the network entity.

25. The apparatus of claim 24, wherein a number of bits of the SPS PUCCH HARQ codebook are deferred based on whether a number of codebook bits corresponding to the second HARQ feedback payload not configured for deferral is less than a predetermined value.

26. The apparatus of claim 25, wherein the predetermined value comprises a fixed number of HARQ bits, wherein all of the bits of the SPS PUCCH HARQ codebook are deferred based on the number of codebook bits corresponding to the second HARQ feedback payload being less than the fixed number of HARQ bits.

27. The apparatus of claim 25, wherein the predetermined value comprises a fixed percentage value of a total amount of HARQ bits in the SPS PUCCH HARQ codebook, wherein all of the bits of the SPS PUCCH HARQ codebook are deferred based on the number of codebook bits corresponding to the second HARQ feedback payload being less than the fixed percentage value of the total amount of HARQ bits.

28. The apparatus of claim 25, wherein no bits of the SPS PUCCH HARQ codebook are deferred when the number of codebook bits corresponding to the second HARQ feedback payload not configured for deferral is not less than the predetermined value.

29. The apparatus of claim 21, wherein the downlink configuration allows for deferral of, at least in part, an SPS PUCCH HARQ codebook based on whether a resulting SPS PUCCH HARQ codebook corresponds to a single PUCCH resource identifier in a resulting PUCCH resource set.

30. An apparatus for wireless communication, comprising:
at least one processor;
a transceiver; and
a memory, coupled to the at least one processor and the transceiver, storing code executable by the at least one processor to cause the apparatus to:
transmit, to a user equipment (UE), via the transceiver, a downlink configuration of a first physical uplink control channel (PUCCH) group that configures a first hybrid automatic repeat request (HARQ) feedback payload corresponding to a first semi-persistent scheduling (SPS) downlink packet for deferral and does not configure a second HARQ feedback payload corresponding to a second SPS downlink packet for deferral, wherein the apparatus configures the UE to transmit joint HARQ feedback on a physical uplink control channel (PUCCH) including the first HARQ feedback payload and the second HARQ feedback payload; and
receive, from the UE, via the transceiver, a delayed transmission of at least the first HARQ feedback payload based on different configurations for HARQ feedback deferral between the first SPS downlink packet and the second SPS downlink packet.

* * * * *